United States Patent [19]

Schiler

[11] 3,802,297
[45] Apr. 9, 1974

[54] ADJUSTABLE SHOT-PIN LOCKING MECHANISM
[75] Inventor: Frederick S. Schiler, Stow, Ohio
[73] Assignee: Portage Machine Company, Akron, Ohio
[22] Filed: Feb. 21, 1973
[21] Appl. No.: 334,368

[52] U.S. Cl. .............................. 74/813 L, 74/527
[51] Int. Cl. ............................................. B23b 29/24
[58] Field of Search ............. 74/813, 814, 815, 826, 74/527, 89.15

[56] References Cited
UNITED STATES PATENTS
1,923,440  8/1933  Hunt et al. ...................... 74/813 L
2,968,973  1/1961  Mead .............................. 74/815 X
3,094,885  6/1963  Flannery et al. ...................... 74/826

Primary Examiner—Leonard H. Gerin
Assistant Examiner—Frank H. McKenzie, Jr.
Attorney, Agent, or Firm—Freeman & Taylor

[57] ABSTRACT

A shot-pin locating mechanism for use in locating relatively movable precision parts in fixed locations with respect to each other, with the locating receiving mechanism characterized by the use of a rotatable shot-pin and receiving bushing that has the receiving cavity or bore thereof located eccentrically with respect to its outside diameter whereby rotation of the receiving bushing around its axis of rotation results in linear adjustment between the points of interlock for the relatively movable members that support the shot-pin and shot-pin receiving bushing respectively.

3 Claims, 8 Drawing Figures

ADJUSTABLE SHOT-PIN LOCKING MECHANISM

BACKGROUND OF THE INVENTION

1. Field of the Invention

In the art of layout and inspection of parts to a high degree of precision, it is common practice to place the object being layed out or being inspected on a work-supporting surface which is in turn movably supported on a fixed surface, such as a base, way, or other like surface.

Frequently devices of this type take the form of a rotary table that has the work piece provided thereon and is then rotatable about an axis so as to permit inspection or laying out of all sides of the work piece from a single point.

2. Description of the Prior Art

A typical rotary table of this type is set forth in applicant's prior U.S. Pat. No. 3,175,820 entitled "Rotary Table Having Trimetric Adjustment Features."

While rotary tables are commonly used for inspection purposes as above-noted, it is also possible to have a linear movement between the piece supporting the work and the base of the inspection machine. In all instances, however, it is preferably desirable to have certain checkpoints or stations at which a very accurate dimension can be obtained with regard to the relationship between the fixed and moving parts.

In the case of a rotary table, for example, it is generally desirable to have the parts being capable of being locked, indexed, or located at various predetermined positions in degrees, such as at 45 degree increments, for example.

Because of the high degree of precision required in inspection of this type, it is mandatory that the distance being indexed or moved must be calibrated to a high degree of accuracy because of the fact that any inaccuracy in movement would cause the amount thereof to be magnified many times when a further measurement is taken between successive indexed positions.

In the past it has been conventional to utilize shot-pin types of mechanical interlocks for this purpose, with the shot-pin consisting of a retractable plug carried by one table component and adapted to be inserted in locked relationship within a bushing that is carried by the other component.

SUMMARY OF THE INVENTION

It has been found that it is difficult, if not impossible, to obtain the degree of accuracy required by the use of conventional machining techniques, and it is for this reason that Applicant has conceived an adjustment means for relocating the shot-pin receiving bushing with respect to the part carrying the same so that it is possible to achieve fine adjustment of the actual location of the shot-pin receiving bushing which will receive the normally fixed shot-pin.

Production of an improved shot-pin assembly having adjustment features that permit adjustment of the locating position once the shot-pin has been assembled within the component parts accordingly becomes the principal object of this invention, with other objects of the invention becoming more apparent upon a reading of the following brief specification, considered and interpreted in the light of the accompanying drawings.

Figure 3:
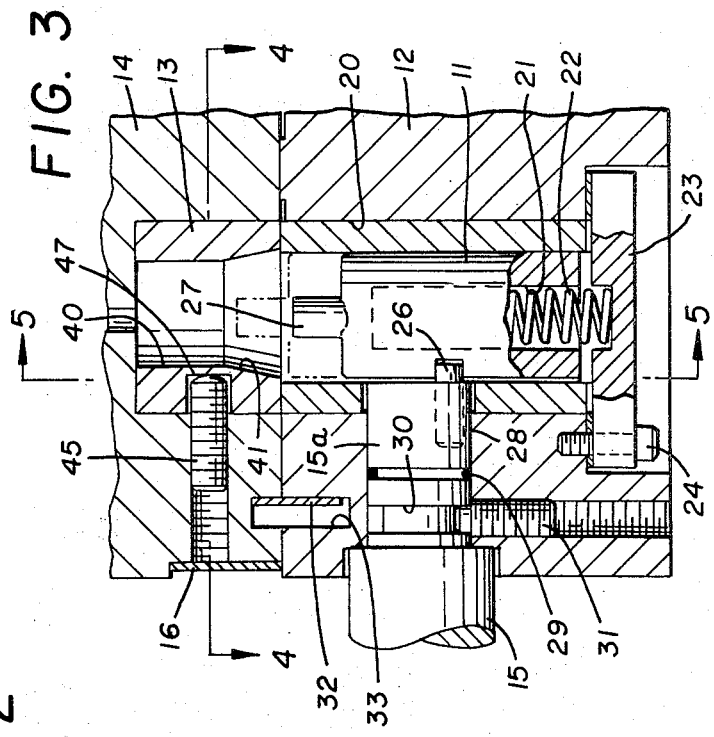
FIG. 3 is an enlarged sectional view showing the detail of the shot-pin assembly.
Figure 4:
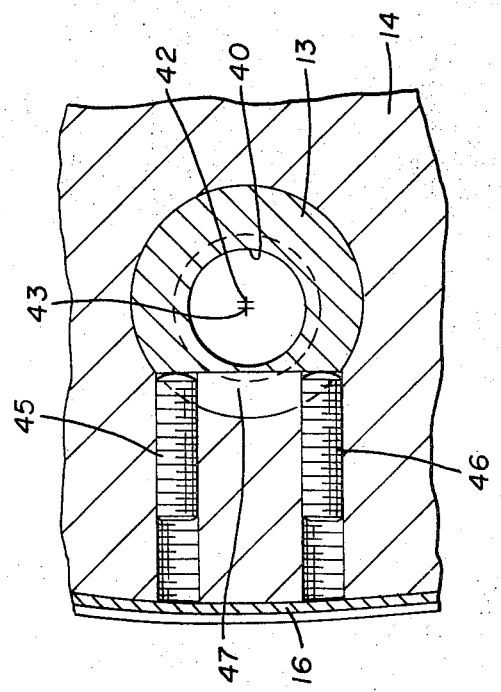
Figure 5:
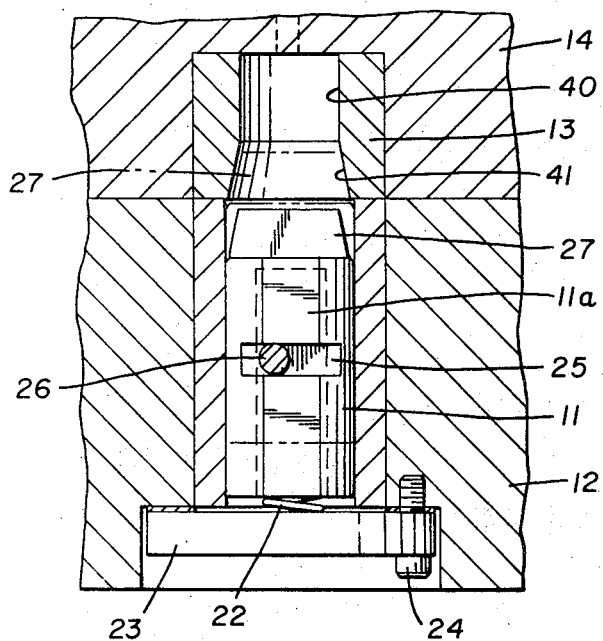

FIGS. 4 and 5 are sectional views taken on the lines 4—4 and 5—5, respectively, of FIG. 3.

Figure 6:
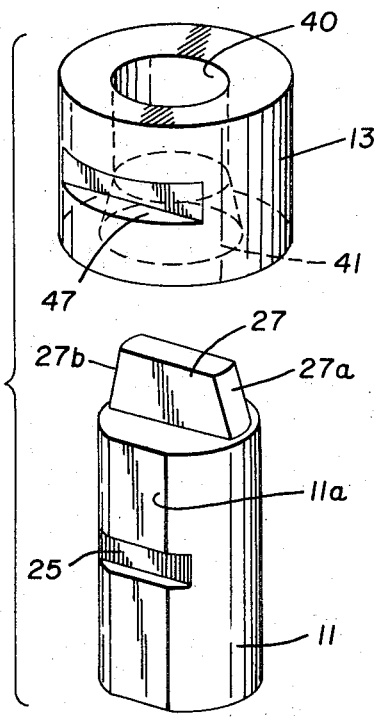

FIG. 6 is a perspective view showing the shot-pin and shot-pin receiving bushing.

Figure 7:
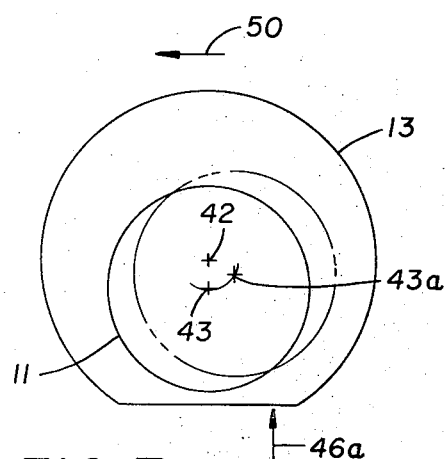
Figure 8:
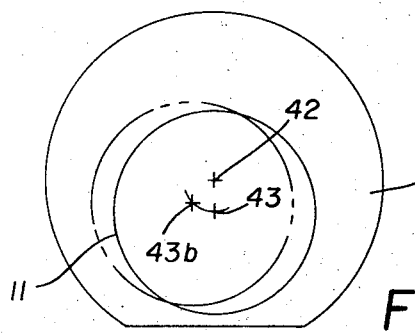

FIGS. 7 and 8 are schematic views illustrating the manner of adjusting the location of the shot-pin receiving bushing.

BRIEF DESCRIPTION OF THE PREFERRED EMBODIMENT

Referring now to the drawings and in particlar to FIGS. 1 and 2, the improved shot-pin assembly, generally indicated by the numeral 10, includes a shot-pin 11 carried by a lower plate member 12 and being movable into and out of engagement with a shot-pin receiving bushing 13 that is carried by the upper rotating table 14, with movement of the shot-pin vertically or axially being achieved by the use of a crank handle 15 in a manner that will be subsequently described.

Figure 1:
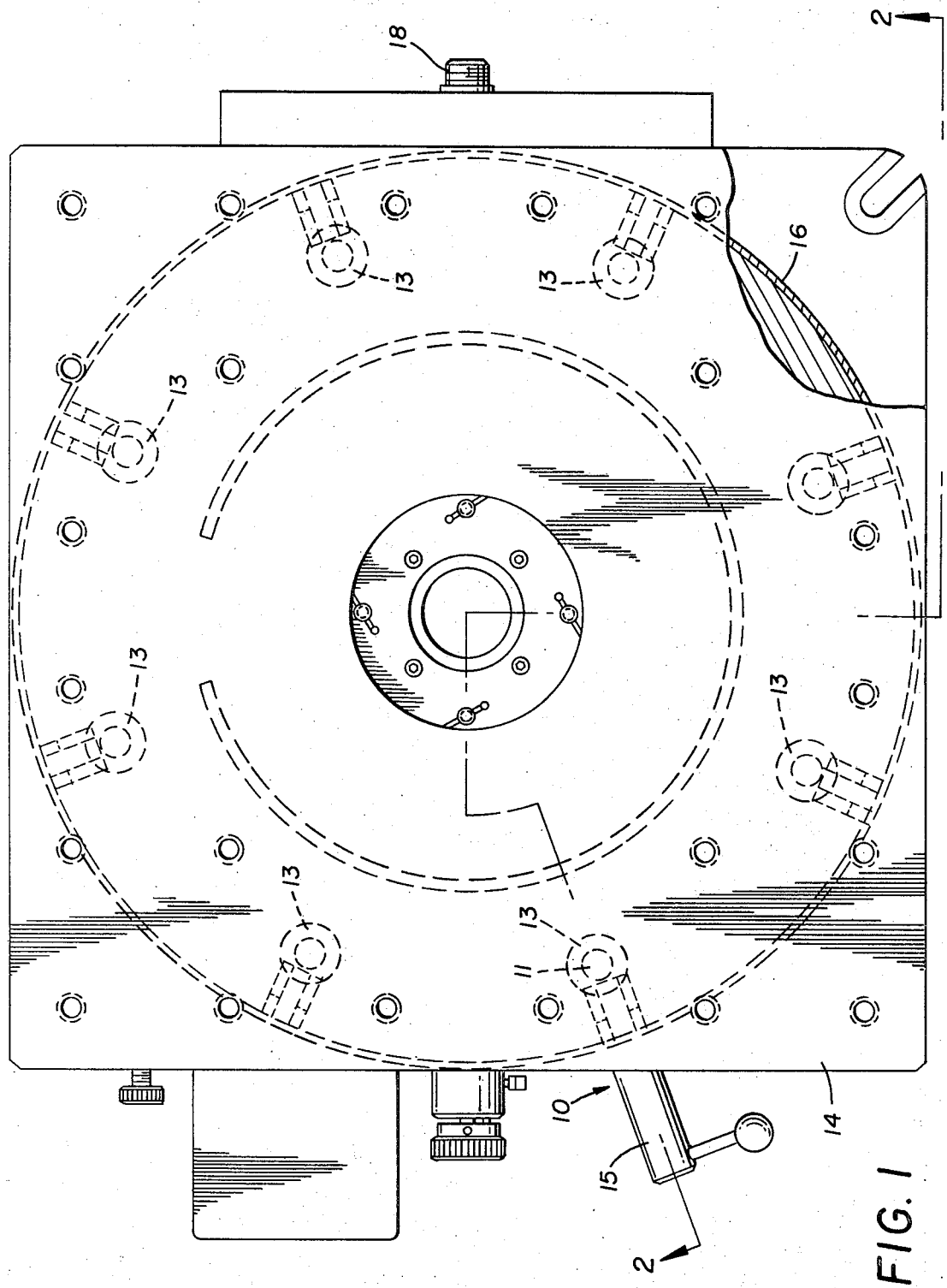
FIG. 1 is a top plan view partly broken away and in section and showing environmentally a rotary table utilizing the improved adjustable shot-pin assembly.
Figure 2:
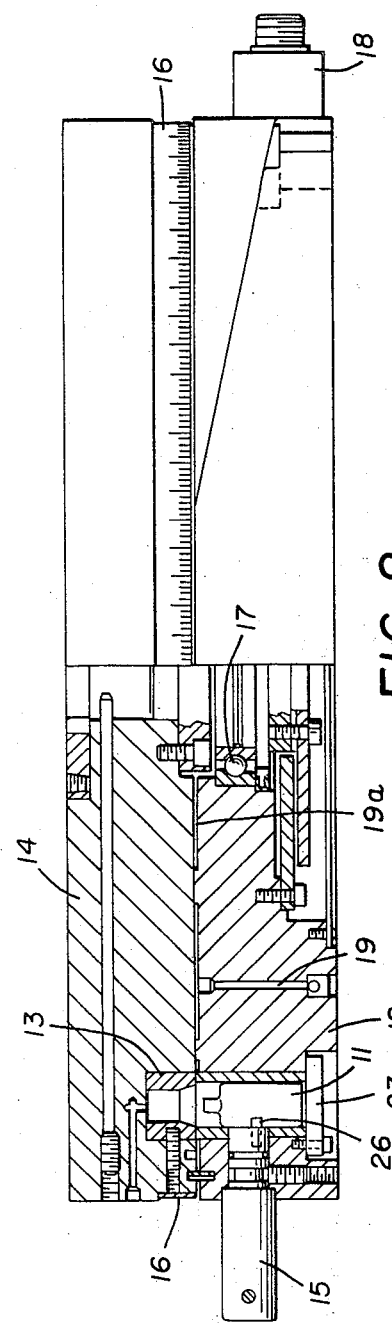
FIG. 2 is an elevational view partly broken away and in section taken on the lines 2—2 of FIG. 1.

As will be noted from FIG. 1, the shot-pin 11 and the crank handle 15 associated therewith are located at a fixed point on the lower plate member 12 so as to be adaptable to cooperate and coact with any one of a series of shot-pin receiving bushings 13,13 that are provided in the upper plate 14, with FIG. 1 indicating that each such shot-pin receiving bushings 13 are provided in the unit illustrated so as to give exactly 45 degree increments of rotation between each position.

A scale 16 is disposed about the circumference of table 14 and indicates the amount of rotation between the top member 14 and the bottom plate member 12. Once the table 14 has been moved to the approximately correct position, the shot-pin handle 15 will be operated to lock the top member 14 in the exact point of registry that is desired. Bearings 17,17 facilitate rotation around the axis of rotation of the table, and conventional fittings 18 are provided for the purpose of exhausting air between the surfaces of the plate as through chambers 19 and undercuts 19a with all of this being well known in the art and not forming a part of the present invention.

Turning now to FIGS. 3 through 6 for a detailed description of a typical shot-pin assembly 10, it will first be noted in FIG. 3 of the drawings that the lower plate member 12 includes a vertical bore 20 within which a shot-pin 11 may be received, with it being noted in FIG. 3 that the shot-pin per se has an internal bore 21 within which a spring 22 may be seated. Plate 23, held in position by bolts 24,24, serves to retain the spring 22 within the bore 21 and constantly urges the pin 11 upwardly to the locked position shown in broken lines in FIG. 3.

For the purpose of preventing rotation, the shot-pin is provided with a flattened face 11a as shown in FIG. 6, with this face having a groove 25 provided therein for interconnection with an eccentric pin 26 that is provided on the inboard end of the crank handle 15. This construction just described insures that the shot-pin will move vertically within the bore 11 without any axial rotation upon rotation of crank handle 15 to disengage it against the force of spring 22 when desired.

The upper or engaging end of the shot-pin 11 is provided with a flattened conical end indicated by the numeral 27, with the width of this being considerably less than the width of the shot-pin and with the ends thereof being rounded as at 27a, 27b for the purpose of insuring appropriate contact within the walls of the internal bore of the shot-pin bushing as will be described.

Again referring to FIG. 3, the handle 15 is shown having a reduced diameter portion 15a that is received within an appropriate bore 28 of the lower plate 12, with an O-ring 29 serving to provide a seal at this point of contact with the bore 28. An undercut 30 is provided on the reduced diameter portion 15a so as to be engaged by the head of a set screw 31 that is received therein, thus keeping the handle 15 and flat 11a in engagement.

Again referring to FIG. 3 of the drawings, it will be noted that a band 32 is provided within a recess 33 of bottom plate 12 for dirt protection.

Turning now to the construction of a typical shot-pin receiving bushing 13, it will be first noted that the same is of generally cylindrical configuration and includes a through bore 40 that terminates in a conical bore 41 at its bottom end as clearly shown in FIGS. 3, 5, and 6 of the drawings.

In this regard the bushing, as shown in FIGS. 4, 7, and 8, has an axis of rotation that is indicated by the numeral 42, while the axis of rotation of the bores 40 and 41 is indicated by the numeral 43 in FIG. 4 of the drawings. Thus and in this fashion the axis of rotation of the bore is eccentrically offset with respect to the axis of rotation of the bushing.

Again referring to FIGS. 3 and 4, it will be noted that associated with each bushing location the upper rotating table 14 is provided with a pair of tapped and threaded radial apertures within which are received threaded set screws 45 and 46, with the inboard ends of these set screws being designed to be received within the milled slot 47 that is provided on the periphery of the bushing 13 as clearly shown in FIGS. 3, 4, and 6 of the drawings.

The net effect of this is best shown in FIGS. 7 and 8 of the drawings which are schematic in nature and which employ the same reference numerals.

Thus in FIG. 7, after removal of scale 16, where force is applied by the screw 46 in the direction of the arrow 46a, the net effect of such movement will be to effectuate rotation of the bushing 13 around its axis of rotation 42, with the result that the axis 43 of the bore will shift from point 43 to the chain-dotted line position shown, with such axis of rotation being indicated by the numeral 43a.

In FIG. 8 the converse situation is present, and here force applied in the direction of arrow 45a will cause shifting of the axis 43 to the position 43b.

Since the shot-pin 11 remains fixed in its location and since ends 27a and 27b of the pin engage the walls of bore 41, the net effect is that the upper table's point of registry will be adjusted to the left in FIG. 7 as shown by the arrow 50 and to the right in FIG. 8 as shown by the arrow 51.

Once adjustment has been made in the manner just described so that the angle of rotation between adjacent stations is set to the exact degree required, it is merely necessary that the scale 16 be replaced, following which the machine is ready for operation.

While the machine has been disclosed in connection with its use on a rotary table mechanism, it is believed apparent that similar provisions could be used for accurately locating adjacent locating points that occur on linear straight-line movement as in the case of a movable unit rolling along a way, for example.

While a full and complete description of the invention has been set forth in accordandance with the dictates of the Patent Statutes, it is to be understood that the invention is not intended to be limited to the specific embodiment herein shown.

Accordingly, modifications of the invention may be resorted to without departing from the spirit hereof or the scope of the appended claims.

What is claimed is:

1. An improved adjustable shot-pin assembly of the character described for use in precision location of relatively movable first and second parts, comprising;
  A. first and second parts supported for relative movement between each other;
  B. a shot-pin shiftably carried by said first part and having a longitudinal axis;
  C. means for shifting said shot-pin along said longitudinal axis and into and out of extended position with respect to said first part;
  D. a shot-pin receiving bushing rotatably carried by said second part and having
    1. an axis of rotation,
    2. a bore adapted to receive said shot-pin in extended position, with said bore having a center line that is offset eccentrically from said axis of rotation of said shot-pin;
  E. means adapted to selectively apply pressure on either of at least two opposed surfaces of said shot-pin receiving bushing; said opposed surfaces being disposed on opposite sides of said axis of rotation thereof whereby said shot-pin bushing can be rotated around its axis of rotation while the same is carried by said second part whereby said center line of said bore may be shifted transversely of said axis of rotation of said bushing for adjustment of the locating point defined when said shot-pin is located in said bore in said extended position.

2. The assembly of claim 1 further characterized by the fact that said means include
  A. a flattened peripheral surface extending transversely of said bushing;
  B. adjustment screws carried by said second part and adapted to bear against spaced points on said flattened periphery areas that are on opposite sides of the axis of rotation of said shot-pin bushing whereby axial movement of either screw can effectuate rotation of said bushing around its axis of rotation.

3. The device of claim 1 further characterized by the fact that
  A. said bore in said shot-pin bushing is conical;
  B. the projecting end of said shot-pin is of flattened conical configuration for self-locating within said conical bore.

* * * * *